Aug. 23, 1932. W. C. AVEDON Re. 18,571

CLOSURE FOR GARMENTS AND OTHER PURPOSES

Original Filed March 20, 1923

Inventor:
William C. Avedon
by O. H. Krenk his Atty

Reissued Aug. 23, 1932

Re. 18,571

UNITED STATES PATENT OFFICE

WILLIAM C. AVEDON, OF NEW YORK, N. Y., ASSIGNOR TO DIDRICK DYRESEN, OF SOMERVILLE, MASSACHUSETTS

CLOSURE FOR GARMENTS AND OTHER PURPOSES

Original No. 1,520,687, dated December 30, 1924, Serial No. 626,446, filed March 20, 1923. Application for reissue filed June 10, 1931. Serial No. 543,463.

My invention relates to a new and improved closure for garments and other purposes.

One of the objects of my invention is to provide a new and improved closure which shall be an improvement upon the type shown in the Sundback Patent 1,219,881, issued on March 20th, 1917, for a separable fastener, although my invention is not limited to use with fastening means of the particular type shown in said patent, as fastening means having the same general function have been heretofore known and described.

Another object of my invention is to provide a new and improved fastening means whereby the two pieces of cloth or other material which are connected by the fastening means can be completely separated at one end thereof and can then be readily refastened to each other.

Another object of my invention is to provide a new and improved fastening means whereby the movement of a control member in one direction will automatically open the said fastening means at one end thereof and whereby the movement of the said control member in the opposite direction can prevent the separation of the said fastening means.

Other objects of my invention will be set forth in the following description and drawing which illustrate a preferred embodiment thereof.

In the drawing I have only conventionally illustrated the accessory details which may be of the type shown in the before mentioned United States Patent 1,219,881, as my invention is not particularly directed to or limited to any such special type of fastening members.

Figure 1:
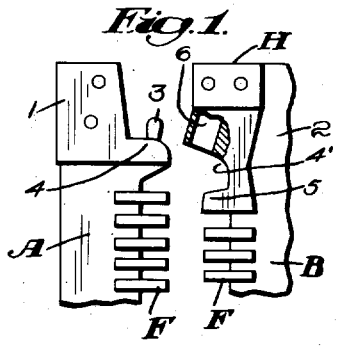
Fig. 1 is an elevation.
Figure 7:
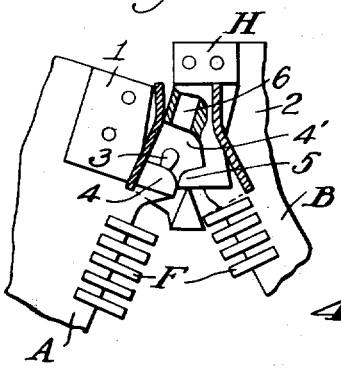
Fig. 7 is a view of the strip shown in Fig. 1 in combination with the slider illustrated in cross-section and showing the manner of engaging the metallic end closure members.

As shown in Fig. 1 my fastening means are adapted to completely close two strips A and B which may be made of fabric or any other suitable material. These two strips may constitute the means for opening and closing any suitable garment, such as brassières, corsets and the like.

The bottoms of said strips A and B may be permanently joined as desired or these strips A and B may be completely separate throughout their entire lengths which may correspond to the entire length of the garment, if this invention is applied to a garment, such as a brassière.

The strips A and B are provided with fastening members F which may be of the type shown in the said United States Patent No. 1,219,881. The control member 7 consists of upper and lower lips, such as shown in the said United States Patent No. 1,219,881 and these upper and lower lips each have a Y shape and they have a wedge-shaped tongue 9 between them so that the movement of the said guide member 7 in one direction causes the fastening means F to automatically interlock or to be automatically separated, as shown in said United States Patent No. 1,219,881. The combination of members F and guide member 7 is well known. However, such closures have been used in combination with fabric strips permanently connected to each other at both ends thereof. Hence, this type of closure cannot be used in garments such as brassières in which the garment is put on and taken off like a coat.

The strips A and B may be provided at their adjacent ends with metallic end closure members 1 and 2. The closure member 1 has a lateral projection 4 provided with a projecting tongue or male member 3. The said member 1 constitutes what may be called the entering member since it enters into and interlocks with the entered member 2. The entered member 2 has a lateral recess 4′ corresponding generally to the shape of the projection 4 provided on the entering member 1 and this recess has a notch or recess 6 adjacent thereto providing a female means into which the tongue 3 may enter.

Figure 6:
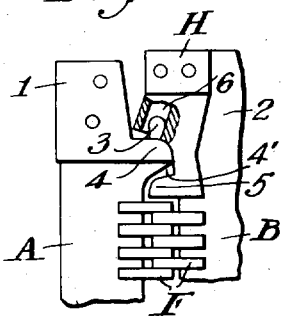
Fig. 6 is a view of the invention illustrated in Fig. 1 but showing the members interlocked.
Figure 2:
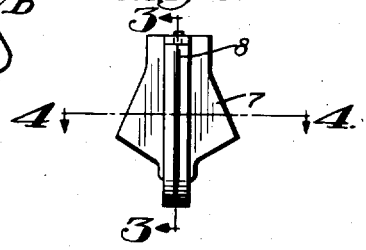
Fig. 2 is a top view of the guide member.
Figure 3:
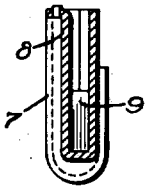
Fig. 3 is a section along the line 3—3 of Fig. 2.
Figure 5:
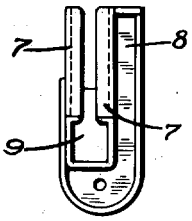
Fig. 5 is a side elevation of Fig. 2.
Figure 4:
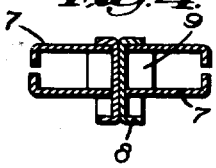
Fig. 4 is a section on the line 4—4 of Fig. 2.

Hence, the wearer can manually interlock the members 1 and 2 when the male member 3 fits into the recess 6 and the members 1 and 2 are therefore closely interlocked (Fig. 6) and by then moving the guide member 7 downwardly so as to interlock all the fastening members F it is impossible to separate the strips A and B.

If, however, the guide member 7 is moved upwardly, this automatically separates all the fastening members F including those directly adjacent the members 1 and 2 and the further movement of the guide member 7 causes the tongue 9 to pass between the bottoms of the fastening members 1 and 2 so that the fastening member 1 is rocked away from the member 2 as the slot 6 is made sufficiently wide to allow for a certain rocking movement. The tongue 9 therefore presses against the member 1 until it is completely removed from the entered member 2. The parts are thus completely unlocked and the member 2 is provided with a head H to prevent the removal of the guide member 7.

When it is desired to relock the strips A and B, the wearer manually interlocks the members 1 and 2 and by fastening together the adjacent members F any rocking movement of the member 1 is prevented and hence it cannot be accidentally unlocked from the member 2. During the operation of positioning the strips relative to each other for interlocking engagement of the fastening members F, the projection 4 on the member 1 must be in a position to enter the recess 4′ in the member 2 before the fastening members F are properly aligned for interengagement. Unless the end entered member and the end entering member are so positioned the slider will be prevented from movement to interlock the fastening members F. Thus I have provided suitable means which prevents improper locking of the fastening members of the strips.

The slide or guide member 7 has a band 8 connected thereto, to which a piece of ribbon can be connected for manipulating slide 7. When the members 1 and 2 are connected, their inner ends are separated so that the thin end of wedge-shaped tongue 9 can enter between them and separate them.

I have described a preferred embodiment of my invention but it is clear that numerous changes and omissions can be made without departing from its spirit.

It will be observed from Fig. 1 that the length of the projection 3 is slightly less than the length of the recess 6 which may be called the longitudinal recess, although its axis is somewhat inclined to the strips A and B. Hence when the fastening members F adjacent the members 1 and 2 are forced apart by the upward movement of the slide 7, the member 1 is rocked to such an extent that the wedge 9 can pass between the members 1 and 2 and completely separate the said members 1 and 2.

The slide 7 has a projection 8 to which a manipulating member can be connected.

The wedge member 9 preferably has arcuate sides.

I claim:—

1. An end closure for two strips having interlocking fasteners adapted to be connected and separated by the movement of a slidable member adapted to be slid to and fro over said interlocking fasteners, comprising an end entering member secured to one strip and an end entered member secured to the other strip, said end entered member having a lateral recess and a longitudinal recess communicating with said lateral reeess, said entering member having a lateral portion adapted to enter said lateral recess, said lateral portion having a longitudinal dog adapted to enter said longitudinal recess, and said longitudinal recess being of greater diameter than said dog.

2. An end closure for two strips having interlocking fasteners on adjacent edges adapted to be engaged and disengaged by movement of a slider over said fasteners, said end closure comprising an end entering member secured to one strip adjacent to the end of one row of fasteners and an end entered member on the other strip, said end members having interengaging means for fastening them together and thereby to bring the fasteners of one strip into proper position for interlocking engagement with the fasteners on the other strip, and an immovable lateral projection extending from one of the said end members and adapted to aid in positioning the interlocking fasteners on one strip with those on the other strip before they can be properly interlocked.

3. An end closure for two strips having interlocking fasteners adapted to be connected and separated by the movement of a slidable member adapted to be slid to and fro over said interlocking fasteners, comprising an end entering member secured to one strip, and an end entered member secured to the other strip, said end members having interengaging portions for securing them together when desirable, one of said end members having a lateral projection and the other having a recess to receive said lateral projection thereby to insure proper positioning of the interlocking fasteners on one strip with those on the other strip before they can be interlocked.

In testimony whereof I hereunto affix my signature.

WILLIAM C. AVEDON.